INVENTOR.
THEODORE F. CARLSON
BY
ATTORNEY

United States Patent Office 3,007,729
Patented Nov. 7, 1961

3,007,729
ADJUSTABLE BALL STUD UNIT
Theodore F. Carlson, 2711 S. Race St., Denver, Colo.
Filed Nov. 9, 1959, Ser. No. 851,861
4 Claims. (Cl. 287—90)

This invention relates to mechanical pivotal connections of ball-and-socket type effective as joints accommodating limited rotary motion in every direction, and more particularly to ball stud connections of such type adapted to operatively intercouple conventionally-associated components of automotive vehicles, and has as an object to provide a novel and improved ball stud unit convenient of wear-compensating adjustment in position of practical use.

A further object of the invention is to provide a novel and improved adjustable ball stud unit that is expedient of practical installation in substitution for analogous conventional connections.

A further object of the invention is to provide a novel and improved adjustable ball stud unit that is sturdy and secure in all conditions of adjustment within its variable range.

A further object of the invention is to provide a novel and improved adjustable ball stud unit that is feasible of economical production.

A further object of the invention is to provide a novel and improved adjustable ball stud unit that is amendable to conventional lubrication.

A further object of the invention is to provide a novel and improved adjustable ball stud unit construction characterized by high resistance to wear and facility of component production, conditioning, and assembly.

A further object of the invention is to provide a novel and improved combination and operative correlation of components constituting an adjustable ball stud unit.

A further object of the invention is to provide a novel and improved adjustable ball stud unit susceptible of production in diverse particularity suited to operative coaction with differing use environments, that is structurally variable in realization of a unique principle and mode of operation, that is durable and long-lived in arduous practical use, and that promotes safety and dependability of vehicle operation in substitution for conventional analogous fittings of automotive equipment.

With the foregoing and other objects in view, my invention consists in the construction, arrangement, and operative combination of elements as hereinafter set forth, pointed out in my claims, and illustrated by the accompanying drawing, in which—

It is currently conventional practice in automotive vehicle construction to operatively associate the steerable wheels of the vehicle with their load through the agency of spring-biased, upper and lower, complementary control arms disposed laterally and at each side of the vehicle to embracingly engage at their outwardly-directed, vertically-spaced, free ends with upper and lower arms of a steering knuckle yoke whereto connection is had by means of ball stud joints arranged to establish a generally-vertical axis of articulation for the so-associated knuckle and to accommodate variations in the angular correlation of said axis with the control arms inevitably resulting from vehicle operation. Subject under heavy load to shocks and stresses of varying magnitude and incidence, the ball stud joints of the conventional linkage above described are prone to wear and deform during use of the so-equipped vehicle and thereby to promote undesirable play and looseness in the dirigible control of the latter with attendant clatter of the worn components and enhanced potential for structural failure of the joints, and the instant invention is hence directed to the provision of a novel and improved ball stud unit of extensive general utility and especial advantageous applicability to the use environment just discussed that is distinguished by an expedient wear-resistant construction and reliable, selective, wear-compensating adjustability adapting it for use in substitution, or as a replacement, for the conventional similar equipment hitherto supplied.

Figure 1:
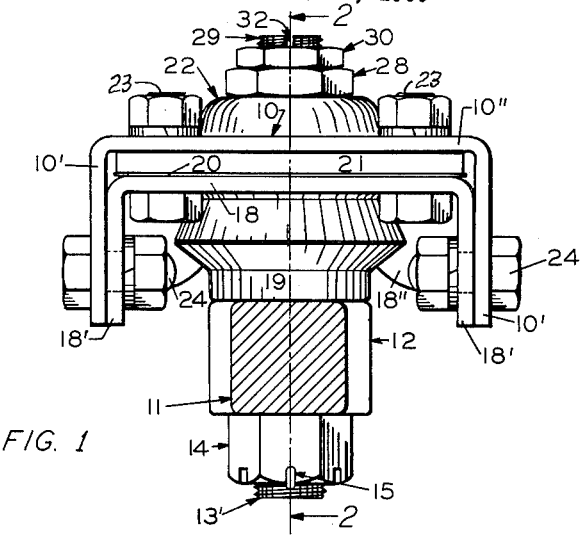
FIGURE 1 is an elevation of a typical embodiment of the invention as mounted in one position of practical use, associated conventional elements of the resulting assembly being but fragmentarily represented.
Figure 2:
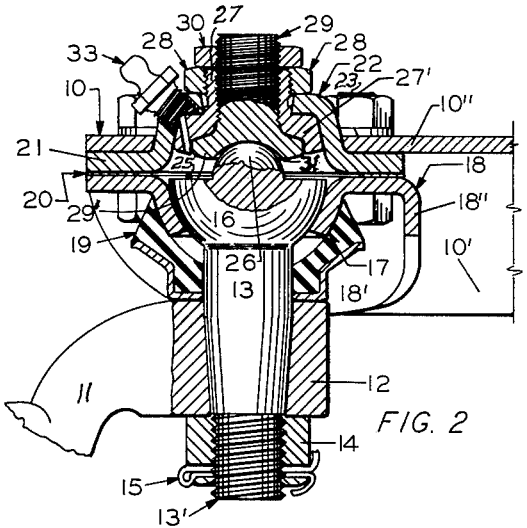
FIGURE 2 is a sectional view taken approximately axially and substantially on the indicated line 2—2 of FIGURE 1 with portions of interior elements broken away to clarify their structural relationship.

Susceptible of obvious variation in size and structural detail appropriate for its adaptation to use with and at either end of the steering yoke axis established by the interassociation of control arms and steering yokes of diverse specialty, the exemplary embodiment of the invention according to FIGURES 1 and 2 is represented as applied to operatively intercouple the outer end of an upper control arm 10 and the coacting upper arm of a steering yoke 11 of a conventional arrangement extensively in use. The upper and lower arms of the conventional yoke 11 correspondingly terminate in cylindrical bosses 12 coaxially apertured to establish like, inwardly-convergent, frusto-conical seats concentric with the axis of yoke articulation, and the free end of the control arm 10 is of inverted channel form characterized by spacedly-parallel, depending flanges 10' marginally of a flat web 10'' generally perpendicular to the axis of yoke articulation intersected by a spaced plurality of attaching holes surrounding a relatively-large aperture substantially concentric with the axis of yoke articulation.

In common with the conventional ball stud fittings whereover it is an improvement, the unit of the instant invention includes a strong, rigid, generally-cylindrical stem 13 characterized by an axially-straight shank formed with a tapered zone conformably receivable in the seat of the yoke arm boss 12 and convergent toward a threaded shank terminal 13' adapted to project inwardly of the yoke 11 beyond the boss 12 for coaction with a clamp nut 14 disposed in bearing engagement with the adjacent face of the boss to secure and retain the stem in fixed seated engagement with the associated boss and in outward extension therefrom as a pintle element coaxial with the axis of yoke articulation, any expedient means, such as a cotter pin 15, being provided to immobilize the tightened nut 14. Further in operative approximation of conventional ball stud fittings, the end of the stem 13 remote from its terminal 13' is formed as an integral, enlarged, exteriorly-spherical head portion 16 symmetrically centered upon the axis of the stem, a feature of the invention hereinafter elaborated being the hemispherical extent and specific conformation of said head portion, which head portion is conformably accommodated within and to rock relative to a correspondingly-spherical and concentric concavity 17 offset from and opening through an attachment fitting 18 hereinbelow more fully described, a cup-like housing 19 of resilient character and appropriate form, conventional or other, being provided to exteriorly embrace and close as a grease seal between adjacent outer surface areas of the stem 13 and concavity 17. The attachment fitting 18 is formed with a flat area surrounding its concavity 17 which closes through the agency of a gasket 20 to and against a corresponding flat area of a complementary attachment member 21 characterized by an integral, cup-like offset 22 constituting a socket receivable through the large aperture opening in the web 10″ of the control arm 10 and adapted to close in registration with and over the concavity 17 of the fitting 18 when the latter is closed against the member 21, and attaching holes intersect the flat areas of the fitting 18 and member 21 for registration with the attaching holes of the web 10″ of the control arm 10, and with each other, when the socket of the offset 22 and the concavity 17 are in coaxial alignment, whereby to condition the so-apertured elements for registered integration by means of fasteners, such as threaded studs 23, tightened in engagement through the registered sets of attaching holes to correlate and detachably assemble the fitting 18, member 21, and web 10″ of the control arm 10 with the member 21 directly underlying the web and the fitting 18 closing through the gasket 20 to the underside of said member to constitute the desired joint at the upper end of the yoke axis. Where the free end of the control arm 10 is of inverted channel form presenting the side flanges 10′, as shown and described, it is conventional to form the member 21 to a transverse width freely receivable between said flanges and to furnish the fitting 18 with depending side flanges 18′ and a transverse end flange 18″ adapted to interfit between the flanges 10′, whereby to enhance the rigidity of said fitting and to establish an overlying coaction of the flanges 10′ and 18′ susceptible of consolidation by means of fasteners, such as threaded studs 24, clampingly engaged therethrough.

Figure 3:
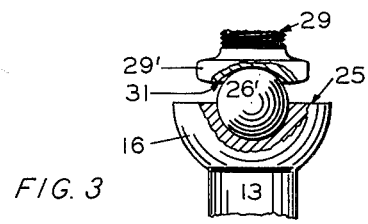
FIGURE 3 is a fragmentary, detail view, partially in section, of an alternative structural coaction within the contemplation of the invention.

That which distinguishes the ball stud unit of the invention is the organization within the generally-conventional environment above detailed of means for adjustably and securely maintaining the spherical head portion 16 of the stem 13 in appropriate bearing coaction with its seat in the concavity 17 in a novel, practical, and reliable manner. A first feature of the invention, above mentioned, is the restriction of the head portion 16 of the stem 13 to but hemispherical extent determined by a diametric plane therethrough perpendicular to the axis of the stem definitive of a flat, annular, stem termination 25 adapted for initial planar coincidence with the surrounding flat area of the fitting 18 when the axis of the stem 13 is normal thereto, and the provision centrally of said termination 25 of a hemispherical boss 26, of relatively-reduced diameter, centered in the plane of said termination. Feasibly, the boss 26 may be integral with the head portion 16, as indicated in FIGURE 2, and it is alternatively practical, when deemed to be expedient, to constitute said boss as the upper and protuberant half of a separate sphere 26′ loosely received in a conforming semispherical recess centrally of the termination 25, as represented by FIGURE 3, the alternative constructions shown and described being functionally identical and structurally equivalent.

The boss 26 provides a bearing reactive to imposed thrust to urge the head portion 16 to its proper seat within and coaction with the concavity 17, and a further feature of the invention is a unique arrangement adjustably effective to apply the load acting through the control arm 10 to and radially of said boss as thrust acting to maintain said head portion snugly seated in its associated concavity. Accessible for adjustment exteriorly of the offset 22 characterizing the member 21, the thrust-transmitting arrangement of the invention includes an internally and externally threaded sleeve 27 formed with a terminal bell enlargement 27′ conformed to fit within and fill the base of the socket defined by the offset 22 in shouldered coaction with the apertured base closure of the latter effective to extend the threaded other end of the sleeve exteriorly of and in axial coincidence with said offset for engagement by a clamp nut 28 manipulable in opposition to the bell shoulder of the sleeve and in contact with outer surface of the socket base to detachably secure and retain the sleeve in its mounting in said offset with the sleeve bell 27′ opening toward and in clearing relation with the boss 26 of the assembled joint. The internal threads of the sleeve 27 coact with external threads of a cylindrical stud 29 formed with an annular terminal enlargement 29′ conformably receivable in the sleeve bell end 27′ to thereby mount said stud concentrically through and for adjustment axially of the sleeve in extension outwardly of the assembly therebeyond for engagement with a nut 30 manipulable in clamping coaction with the adjacent nut 28, or with the end of the sleeve 27, to secure and retain said stud in any position of its adjustment relative to said sleeve. Coaxially opposed to and adapted to bear against the boss 26 by virtue of the stud and sleeve association shown and described, the terminal enlargement 29′ of the stud is centrally recessed, as at 31, for efficient operative coaction with the convexity of the boss engageable thereby, the concavity of the recess 31 being such as to loosely and shiftably embrace the associated boss, as is indicated in somewhat exaggerated degree by FIGURES 2 and 3 of the drawing, whereby to inhibit undue frictions and possible binding adversely affecting play of the boss therewithin as the stem 13 is caused to shift in its seated coaction with the fitting 18. To facilitate its adjustment toward and away from the boss 26, the stud 29 is provided at its exposed end with appropriate conventional means, such as a diametric scarf 32, coactable with a manipulating tool in a usual and obvious manner. The interior of the joint assembly housing the relatively-movable areas subject to pressures and frictions being effectively closed and sealed in consequence of the described construction and correlation of elements and components, it is feasible to mount a conventional grease fitting, or lubrication nipple, 33 for delivery interiorly of the offset 22 with resulting convenience and dependability of joint lubrication.

Organized as shown and described, the improved ball stud unit of the invention is suited for operative association with and to efficiently intercouple elements of conventional assemblies as either original or replacement equipment, in which association the improved unit accommodates all of the appropriate interactions of the elements coupled thereby with advantageous provision for convenient, wear-compensating adjustment selectively available to determine and to maintain relationships optimum for practical operation of the unit. Supplemental to the functional advantages of the improvement, the structural particularity thereof contributes to economical production, durability, and dependability of the unit, since the unique construction shown and described favors the use of tractable metal for the fitting 18 and member 21 by reason of the elimination of any threaded areas thereof and assigns to the coacting stem, sleeve, and stud components all factors of wear and stress resistance necessary to be met through accurate machining of high-strength hard metals, it being clearly apparent that the form and element arrangement of said stem, sleeve, and stud components condition them for expedient production, machining and tempering as well as for convenient individual replacement.

While the drawing and description represent the improvement applied to function as but the upper end joint of a steering knuckle and control arm assembly, it should be obvious that the unit of the invention is adapted for identical functioning as the lower end joint of the complete assembly through simple inversion thereof.

Since changes, modifications, and variations in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. An adjustable ball stud unit comprising a fitting formed with a hemispherical seat and a complementary member formed with a socket offset adapted for fixed mounted coaction, means separably conjoining said fitting and member in intercommunicating registration of said seat and offset, a stem loosely through and radially of said seat adapted for fixed connection of its end exterior to the seat to structure movable relative to the seat mounting, a ball enlargement terminating said stem within and to conformably work on said seat with areas of said enlargement opposite to the stem exposed exteriorly of the offset, an end-belled, internally-threaded sleeve through and clamp-secured to said offset with its axis radial of and its bell end opening toward said seat, a stud selectively manipulable in threaded engagement and length extension entirely through said sleeve, and an inner end enlargement on said stud receivable in the bell end of said sleeve conformably end-engaged with areas of said ball enlargement thereto opposed in exposure within the offset to maintain said enlargement in working coaction with the seat.

2. The organization according to claim 1, wherein said sleeve loosely traverses the offset to conformably engage its bell end within the socket thereby defined, said sleeve is externally threaded, a clamp nut coacts with said external threads exteriorly of and against said offset to detachably secure the sleeve thereto, said stud is externally threaded to its exterior end and is there worked for operative coaction with a manipulating tool, and a clamp nut coacts with the threads adjacent such exterior end of the stud against opposed elements of the sleeve and its clamp nut to secure the stud in any position of its relative adjustment.

3. An adjustable ball stud unit comprising a fitting formed with a hemispherical seat and a complementary member formed with a socket offset adapted for fixed mounted coaction, means separably conjoining said fitting and member in intercommunicating registration of said seat and offset, a stem loosely through and radially of said seat adapted for fixed connection at its end exterior to the seat to structure movable relative to the seat mounting, a hemispherical ball enlargement the extent of which is determined by a diametric plane perpendicular to the stem axis, said ball enlargment coaxially terminating said stem within and to conformably work on said seat, a convex boss concentrically protruding from the diametric plane of said ball enlargement, and end-belled, internally- threaded sleeve through and clamp-secured to said offset with its axis radial of and its bell end opening toward said seat, a stud selectively manipulable in threaded engagement and length extension entirely through said sleeve, an inner end enlargement on said stud receivable in the bell end of said sleeve, and a recess concentrically interrupting the exposed area of said inner end stud enlargement in engagement with and for reaction with opposed zones of said boss to maintain the ball enlargement in working coaction with the seat.

4. In a ball stud unit having a fitting formed with a hemispherical seat, a complementary member formed with a socket offset coactable in intercommunicating registration of said seat and offset and in fixed mounted association with said fitting and means separably conjoining said member and fitting, a stem loosely through and radially of said seat adapted for fixed connection at its end exterior to the seat to structure movable relative to the seat mounting, and a ball enlargement terminating said stem within and to conformably work on said seat, the improvement that comprises having the ball enlargement hemispherical in conformation and having its extent determined by a plane diametrically thereof perpendicular to the stem axis, a boss semispherical to a radius substantially less than that of the ball enlargement concentrically protruding from the diametric plane of the latter, an externally and internally threaded, end-belled sleeve loosely traversing said offset with its bell end conformably engaged within the socket thereby defined and its axis radial of said seat, a clamp nut coacting with the external threads of said sleeve exteriorly of and against said offset, a stud selectively manipulable in threaded engagement and length extension entirely through said sleeve, a clamp nut coacting with the threads at the exterior end of said stud adapted to bear against adjacent sleeve and clamp nut elements, an inner end enlargement on said stud receivable in the bell end of said sleeve in regulable opposition to said boss, and a recess concentrically of said stud inner end enlargement concaved eccentrically of said boss for play-accommodating reception of boss arcs tangentially opposed thereto.

References Cited in the file of this patent

UNITED STATES PATENTS

| 1,910,926 | Lutz | May 23, 1933 |
| 1,959,563 | Baker | May 22, 1934 |
| 2,539,186 | French | Jan. 23, 1951 |
| 2,845,290 | Latzen | July 29, 1958 |
| 2,883,221 | Latzen | Apr. 21, 1959 |

FOREIGN PATENTS

| 167,572 | Australia | Apr. 30, 1956 |
| 630,596 | Great Britain | Oct. 17, 1949 |

UNITED STATES PATENT OFFICE
CERTIFICATION OF CORRECTION

Patent No. 3,007,729                              November 7, 1961

Theodore F. Carlson

It is hereby certified that error appears in the above numbered patent requiring correction and that the said Letters Patent should read as corrected below.

Column 5, lines 7 and 8, for "exteriorly" read -- interiorly --; line 43, for "and" read -- an --.

Signed and sealed this 3rd day of April 1962.

(SEAL)
Attest:

ERNEST W. SWIDER                              DAVID L. LADD
Attesting Officer                                 Commissioner of Patents